Patented Mar. 10, 1953

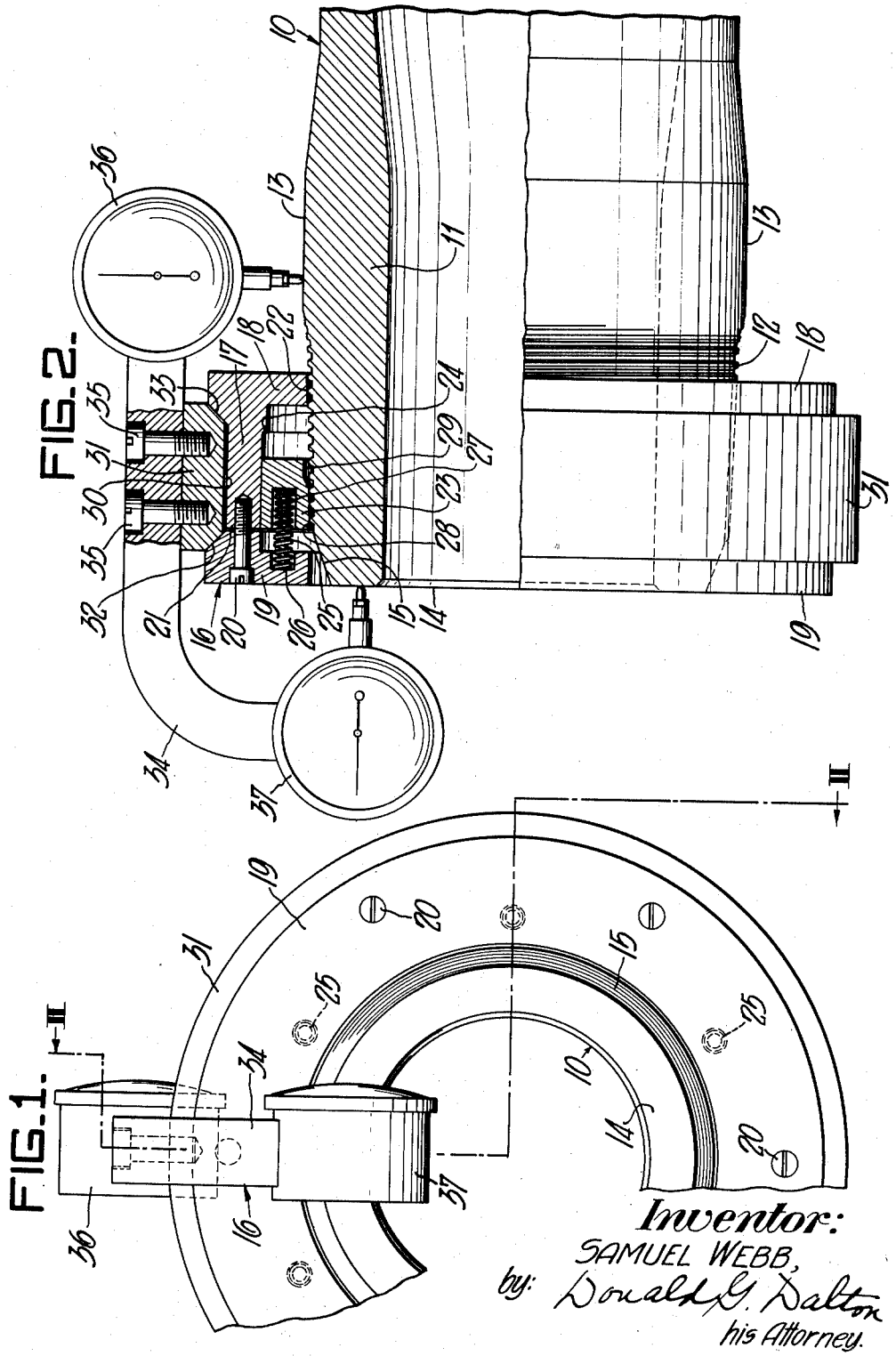

2,630,633

UNITED STATES PATENT OFFICE 2,630,633

GAUGING DEVICE FOR DETERMINING MISALIGNMENT OF LAND AND THREADS OF DRILL PIPES

Samuel Webb, Pittsburgh, Pa., assignor to United States Steel Corporation, a corporation of New Jersey Application November 19, 1948, Serial No. 60,948

6 Claims. (Cl. 33—180)

This invention relates to a gaging device for indicating misalignment of the land portion of the end of a drill pipe relative to the threads thereof and revealing any departure of the end face of the pipe from a plane normal to the axis thereof.

Tool joints are ordinarily screwed onto the ends of drill pipe after being heated, thus producing a shrink fit. To insure accurate alignment of the tool joint and pipe length and obtain uniform radial shrinkage of the tool joint about the land portion adjacent the usual taper threads at the end of the pipe length, the land and threads must be precisely co-axial within close tolerances. For proper seating of the end face of the pipe against the shoulder in the tool joint recess to secure a strong tight joint, furthermore, the face must be plane and normal to the pipe axis within similar tolerances. It is customary to use a concentricity and planeness gaging device on the end of the pipe to reveal any misalignment of the land portion relative to the threads and any departure of the end face from the normal plane. Since the tolerances are very small, erroneous indications may result from wear or misalignment of the gaging device. This may cause the rejection of pipe which actually meets the exacting standards imposed. Gaging devices used heretofore have been notably subject to such errors particularly when the thread taper is either "fast" or "slow," though still within an acceptable tolerance. In known gaging devices, furthermore, loose fit of moving parts caused by wear cannot be taken up. Each different size and type of thread, moreover, requires a different gaging device.

I have invented an improved concentricity and planeness gaging device which overcomes the aforementioned defects of known devices and is thus characterized by greater accuracy as well as further advantages. The object of my invention is to provide a gaging device which may be applied to and removed from the pipe end more rapidly than known devices, is not subject to misalignment and has an adjustment permitting take-up of looseness of fit to compensate for wear. My improved gaging device differs in principle from those known heretofore in that it is applied by axial movement only onto the end of the pipe, without rotation. The invention, in a preferred embodiment, includes a bearing ring having a gage-mounting ring rotatable thereon. The bearing ring has axially spaced annular members, one fixed and one movable, adapted to fit snugly on the crests of spaced groups of threads in the threaded portion of the end of the pipe length. The fixed member is a flange on the bearing ring. The movable member is a wedging ring slidable within the bearing ring and yieldingly urged toward the flange by springs. For accommodating the gage-mounting ring, the bearing ring has a peripheral race with frusto-conical walls or ways. One of these walls is formed on a keeper ring secured to the bearing ring with a shim therebetween which permits adjustment to take up looseness of fit occasioned by wear. The springs urging the wedging ring engage the keeper ring and are compressed between these two rings.

A complete understanding of the invention may be obtained from the following detailed description and explanation which refer to the accompanying drawings illustrating a present preferred embodiment. In the drawings, Figure 1 is an end elevation of my improved gaging device applied to one end of a length of drill pipe; and Figure 2 is a partial section taken axially of the pipe along the plane of line II—II of Figure 1, with parts in elevation.

Referring in detail to the drawings, a length of drill pipe 10 is upset at the ends as indicated at 11, and external threads 12 are formed on a frusto-conical surface tapering toward the extreme end. Axially inward of the threaded portion is a cylindrical land portion 13. The end face of the pipe, as indicated at 14, has a chamfer or frusto-conical surface 15 extending between the end face and threaded portion.

The gaging device of my invention indicated generally at 16 is adapted to be placed on the threaded portion of the pipe when the latter is disposed horizontally. The device consists of a ring 17 having a flange 18 extending radially inward at one side thereof and a keeper ring 19 secured to the other side thereof by screws 20. The keeper ring, in effect, provides a second inwardly extending flange extending radially inward and spaced from flange 18. A shim 21 is disposed between the keeper ring and bearing ring for a purpose which will appear shortly.

The flange 18 has its inner face 22 tapered on the same angle as the threaded portion 12 of the pipe end and is adapted to engage the crests of the threads when the device has been moved far enough axially onto the pipe end. It constitutes the fixed thread-engaging member. A wedging ring 23 is slidable inside the bearing ring 17. The interior surface of the latter is bored to receive the ring 23 and has a shoulder 24 limiting movement of the ring 23 toward the flange 18.

The ring 23 is normally urged toward the flange 18 by a plurality of compression spring 25 seated in registering sockets 26 and 27 in the rings 19 and 23, respectively. The interior surface of the ring 23 is tapered as at 28 on the same angle as the threaded portion 12 of the pipe and is relieved slightly at its inner end by a counter-bore 29. The ring 23 constitutes the movable thread-engaging member.

It will be evident from the foregoing description that when the gaging device is removed from the pipe, the ring 23 will occupy its innermost position, i. e., it will be forced inwardly by the springs 26 against the shoulder 24. When the device is applied to the pipe end, the interior surface 22 of flange 18 will eventually seat on the thread crests adjacent the inner end of the threaded portion. The wedging ring 23 will engage thread crests nearer the end of the pipe. The diameters of the surfaces 22 and 28 of the flange 18 and ring 23, respectively, are so determined that the latter will come to rest on the thread crests before the surface 22 engages them. As a result, the bearing ring 17 will continue to slide over the thread crests after engagement of the surface 28 of the ring 23, with compression of the springs 26, until the surface 22 of the flange 18 fits snugly on the thread crests.

The bearing ring 17 has an external peripheral race 30 formed therein to accommodate a gage-mounting ring 31. The race has frusto-conical walls or ways 32 and 33. The wall 32 is formed on the inner side of the ring 19. An arm 34 having a right angle bend at one end is secured to the ring 31 transversely thereof by screws 35. Dial gages 36 and 37 mounted on the ends of the arm 34 have their plungers riding on the land portion 13 and end face 14, respectively, of the pipe 10. Thus, when the gaging device has been applied as already explained, misalignment of the threaded portion 12 and the land portion 13 will be revealed by variations in the reading of dial 36 as the ring 31 is rotated on its race, while departures of the end face from the plane normal to the pipe axis will be revealed by variations in the reading of gage 37. It will be apparent, of course, that the plunger of gage 36 must be held retracted when the device 16 is being applied to or removed from the pipe end.

In case of wear of the walls or ways 32 and 33 of race 30 or the surface of the ring 31 in contact therewith, any resulting looseness may easily be taken up by removing the shim 21 and replacing it with a slightly thinner shim. In this way, a snug fit may be maintained at all times between the ring 31 and the bearing ring 17.

It will be apparent from the foregoing that the invention has several important advantages in addition to its inherent high degree of accuracy. In the first place, my improved gaging device may be applied to and removed from the pipe end very quickly since these operations require only a straight thrust or pull without any rotation or mating of threads. Secondly, the possibility of misalignment of the gaging device with the threaded portion is eliminated since the interior surfaces of the flange 18 and wedging ring 23 bear solidly on the thread crests whether the thread taper is "fast," "slow" or "normal." Wear of the gage mounting ring or the surface of the bearing ring in contact therewith may be easily taken up by shim replacement as just described. The device may be used on different types of threads of substantially the same maximum diameter and substantially the same taper. Finally, the device is composed of a relatively small number of parts which are easy to manufacture so that the cost thereof is reasonable.

Although I have illustrated and described but a preferred embodiment of the invention, it will be recognized that changes in the details and arrangement disclosed may be made without departing from the spirit of the invention or the scope of the appended claims.

I claim:

1. A device for revealing misalignment between a tapered threaded end portion of a length of pipe and the land portion lying axially inward of said threaded portion, said device comprising a bearing ring having a bore with a diameter larger than the outside diameter of said threaded portion and adapted to be placed over the latter, a flange extending radially inward from said ring having a smooth-bored internal surface adapted to seat on the crests of thread turns adjacent said land portion as the ring is moved axially inward over the pipe end, a wedging ring slidable axially in the bore of the bearing ring and having a smooth-bored internal surface adapted to seat on the crests of thread turns adjacent the end of the pipe length, said bearing ring having external circumferential ways, a gage-mounting ring rotatable on said ways, and a gage member carried by said gage-mounting ring and extending radially inward thereof into engagement with said land.

2. The apparatus defined by claim 1 characterized by means yieldingly urging said wedging ring toward said flange.

3. The apparatus defined by claim 1 characterized by said bearing ring having a second flange extending inwardly thereof on the other side of said wedging ring from said first-mentioned flange and spring means between said second flange and said wedging ring.

4. The apparatus defined by claim 3 characterized by said second flange being a keeper ring removably secured to said bearing ring.

5. The apparatus defined by claim 4 characterized by said ways being formed one on said bearing ring and one on said keeper ring.

6. The apparatus defined by claim 5 characterized by said ways being frusto-conical surfaces.

SAMUEL WEBB.

REFERENCES CITED

The following references are of record in the file of this patent:

UNITED STATES PATENTS

| Number | Name | Date |
|---|---|---|
| 1,064,715 | Dickenson | June 17, 1913 |
| 1,243,310 | Littman | Oct. 16, 1917 |
| 1,340,845 | Strong | May 18, 1920 |
| 1,405,921 | Kipniss | Feb. 7, 1922 |
| 1,949,971 | Miller et al. | Mar. 6, 1934 |
| 1,997,639 | Hetherington et al. | Apr. 16, 1935 |
| 2,083,944 | Cottrell | June 15, 1937 |
| 2,119,206 | Frisz | May 31, 1938 |
| 2,290,731 | Blazek | July 21, 1942 |
| 2,427,924 | Rose | Sept. 23, 1947 |
| 2,443,895 | Day | June 22, 1948 |

FOREIGN PATENTS

| Number | Country | Date |
|---|---|---|
| 167,709 | Great Britain | Aug. 18, 1921 |